United States Patent [19]
Wexler

[11] Patent Number: 4,962,731
[45] Date of Patent: Oct. 16, 1990

[54] ANIMAL TOE NAIL COVERS

[76] Inventor: Toby Wexler, 458 'D' Heyman Blvd, Lafayette, La. 70503

[21] Appl. No.: 384,409

[22] Filed: Jul. 24, 1989

[51] Int. Cl.$^5$ .............................................. A01K 29/00
[52] U.S. Cl. ...................................... 119/143; 132/73
[58] Field of Search .................. 119/143, 144; 132/73, 132/285; 2/21

[56] References Cited

U.S. PATENT DOCUMENTS

| | | | |
|---|---|---|---|
| 2,123,603 | 7/1938 | Henderson | 119/144 |
| 2,232,396 | 2/1941 | Lee et al. | 2/21 |
| 2,935,354 | 5/1960 | Chapman | 2/21 |
| 3,229,690 | 1/1966 | Scholl | 2/21 |
| 3,273,540 | 9/1966 | Fuentes, Jr. | 119/144 |
| 3,967,631 | 7/1976 | Kosal | 132/73 |
| 4,346,720 | 8/1982 | Hokama | 132/73 |

Primary Examiner—John J. Wilson
Assistant Examiner—Frank A. LaViola, Jr.
Attorney, Agent, or Firm—Pravel, Gambrell, Hewit, Kimball & Krieger

[57] ABSTRACT

A pliable sheath for animal toe nails, providing protection for humans, furniture, clothes, and other animals. A sheath of this nature reduces self inflicted trauma to the animal and provides an alternative to declawing. Protection is provided, while still leaving the animal with its natural defenses. The sheath, being adhered to the animal toe nail, loosens and drops off, when the toe nail grows and changes shape. Leaving the animal's own natural defenses in tact.

7 Claims, 2 Drawing Sheets

SEC. A-A

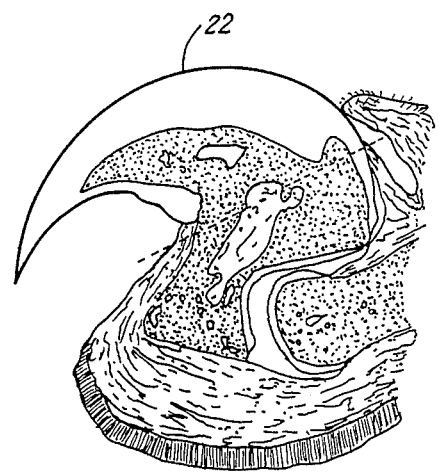
FIG. 7
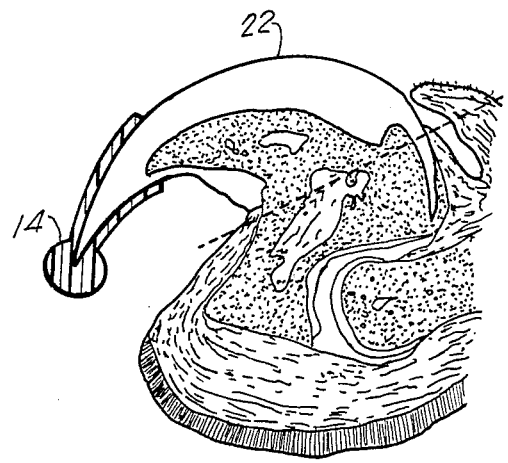
FIG. 8
FIG. 11
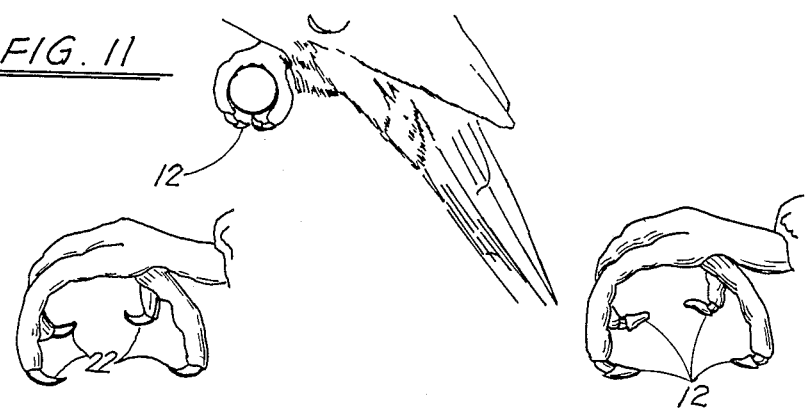
FIG. 9
FIG. 10

ANIMAL TOE NAIL COVERS

BACKGROUND OF THE INVENTION

1. Field of the Invention

The present invention relates to a protective device for animal toe nails. More particularly, the present invention relates to protective covers configured for and applied to, the toe nails of small animals. Such as dogs and cats, providing protection for themselves, people or property.

2. General Background

Small animals in general, and more particularly dogs, cats, Avians and exotics have in recent years become acclimated with humans in the home. Their sharp toe nails create many problems, such as snagging drapes and furniture or scratching people, many times causing infectious wounds to humans. Occasionally the animals even cut themselves from excessive scratching. Many pet owners have opted for claw removal altogether for cats, and frequent nail cutting for dogs. In some cases the animal are sedated, bound and muzzled for the procedure.

With the present invention Veterinarians, pet groomers or the pet owner can easily apply the nail caps. Resulting in little or no, discomfort for the animal, preventing many of the problems mentioned above.

A review of the art shows that artificial nails or toe nail caps, are not used with relationship to animals in the small animal class. There were however several patents relating to artificial fingernails for humans. For example patent Nos. 3,967,631 and 4,694,843 teaches the use of a fingernail cap for protecting the fingernail from dirt, breaking, cracking and the like. Patent Nos. 4,408,622 and 4,346,720 teaches the use of artificial fingernails to enhance the appearance and function of the human fingernail. Patent No. 4,615,348 teaches the use of an adhesive for attaching artificial fingernails to the human fingernail. The art does not address the intention of the present invention, to provide protection FROM the nail.

SUMMARY OF THE PRESENT INVENTION

The present invention solves the problem in a simple and straight forward manner. The invention consist of an elastic Vinyl cap or other such pliable material, especially configured to fit the toe nail of small animals.

The material is such that it can be peeled away with some difficulty or worn away under normal use, when in contact with earth, pavement and the like. This allows the animal to defend its self in case it becomes lost.

Small animals of the canine or feline groups are not the same size, requiring size ranges to fit each group. Sizes are also provided based on weight within each group.

The feline groups ability to rotate their nails above the pad, and the needle like sharpness requires a special cap with a more spherical shape.

The sheaths or caps are provided with an adhesive, applied to the inner surface of the cap. The adhesive activates when pressed into contact with the animal's toe nail.

The animal's owner or a veterinarian applies the caps on a periodic basis as needed thereby protecting humans and their possessions from harm by the animal's toe nails.

Therefore, it is the principal object of the present invention, to provide protective coverings, for the toe nails of small animals kept in the home or in contact with humans.

A further principal object of the present invention is to provide an alternative to declawing small animals.

It is a further principal object of the present invention, to provide a toe nail covering for small animals that can be easily applied, without harm to the animal.

It is also a further object of the present invention to provide sizes for each weight and group of small animals.

It is still a further object of the present invention to provide a material for such toe nail coverings, that can be removed or worn away by the animal over some period.

BRIEF DESCRIPTION OF THE DRAWINGS

A further understanding of the nature and objects of the present invention can be had by referring to the following detailed description. Taken with the accompanying drawings and the numerical references thereon, and wherein:

FIG. 7 is a partial view of a cat's toe without toe nail cover.

FIG. 8 is a partial view of a cat's toe nail with a second embodiment of the toe nail cover.

FIG. 9 is a partial view of a bird's foot without toe nail covers.

FIG. 10 is a partial view of a bird's foot with toe nail covers.

FIG. 11 is a partial view of a bird showing feet on a round perch with toe nail covers.

DETAILED DESCRIPTION OF THE PREFERRED EMBODIMENT

FIGS. 2–4, 8, 10, and 11 illustrate the preferred embodiments of the present invention by the numeral 12 and 14.

Figure 1:
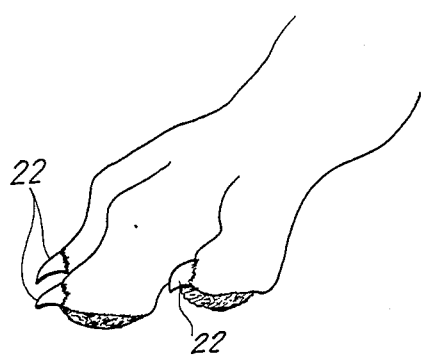
FIG. 1 is a partial view of a dog's foot showing the toe nail configuration.
Figure 2:
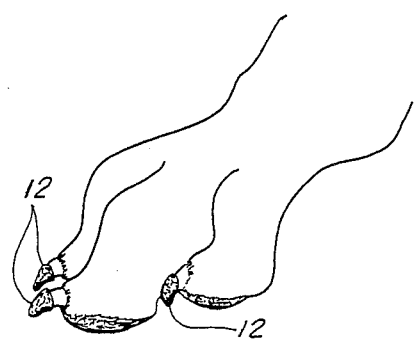
FIG. 2 is a partial view of a dog's foot showing the present invention adhered thereto.
Figure 3:
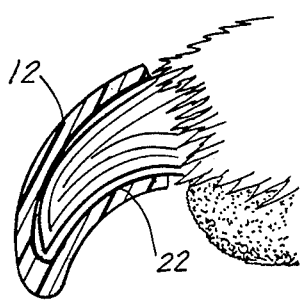
FIG. 3 is a partial view of a dog's foot showing the toe and nail. Shown is a cross section view of the present invention adhered thereto.
Figure 4:
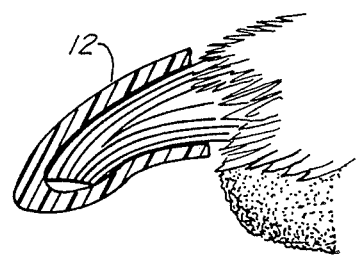
FIG. 4 is a partial view of a dog's foot showing the toe nail trimmed. Also shown is a cross section of the present invention adhered thereto.

As most easily seen, from FIGS. 2, 8 and 11, there is provided, a means for covering the toe nail of an animal. Having the basic form of an elongated, tubular sheath 12. By looking at FIG. 6 we see the sheath closed at its front end 16 and open at its opposite, rear end 18. Defining a cavity for housing the animals nail therein. The sheath 12 shown in cross section in FIG. 6 should be of a material sufficiently flexible and soft, at least along its toe-nail gripping portion 20. The sheath easily slips onto and comfortable encircles the outer surface of the toe nail 22. The material must be tough enough to resist normal wear and still being smooth enough to prevent snagging and scratching.

A plastic such as, for example polyvinyl chloride was found useful for the manufacture of the sheath 12,14, and disclosed as an example of the class of materials envisioned.

Specifically, the inventor has found that a wall thickness of about 0.04 inches produces a sheath 12,14 well-suited for the above purposes. For certain other applications, wall thicknesses in the range of 0.02 to 0.08 inches could be useful.

Figure 5:
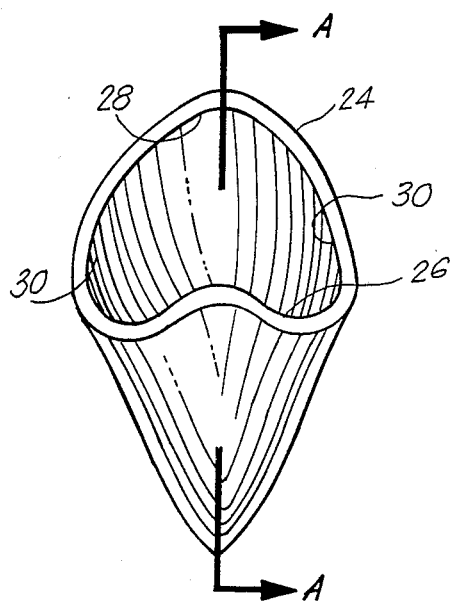
FIG. 5 is an end view, as seen from the open end of the present invention.
Figure 6:
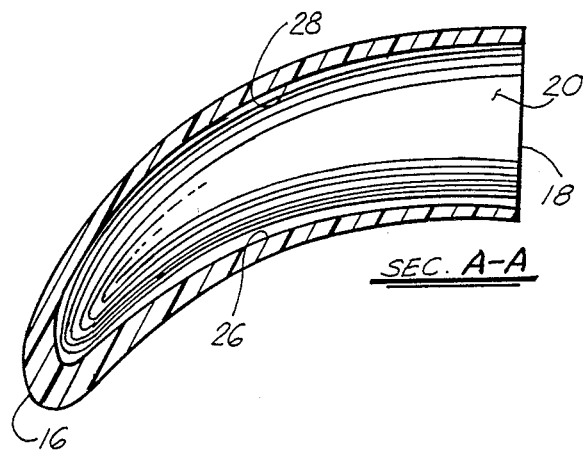
FIG. 6 is a sectional view, taken along lines A—A in FIG. 5.

The cross-sectional area of the cavity, as shown in FIGS. 5 and 6 diminishes toward the closed front end 16. The exterior wall surfaces 24, of the protective sheath 12 are generally parallel to the inner cavity-defining surfaces 20. Lower wall surface 26 and upper wall surface 28 as shown in FIGS. 5,6 slope towards the closed end 16 following the natural contour of the animals toe nail. Simultaneously, side walls 30 converge forwardly. The four walls 26,28, and 30,30 join at the forward end 16, culminating in a somewhat thicker radial wall section.

It should be noted in FIG. 5 that upper wall 28 slopes more sharply than lower wall 26, giving the sheath a cavity shape, generally conforming to the natural curve of the animals toe nail 22.

The feline claw, as shown in FIG. 7 without a sheath, illustrates the cats ability to rotate the claw back over the foot pad giving the effect of retracting the claw. The special shape sheath 14 as shown in FIG. 8, provides for the needle like shape of the nail. Penetration by the claw is prevented with the spherical shaped tip. Feline's claws do not touch the ground while walking. The special shape allows the cap to be extracted from the nail, by raking it on tree trunks should the need arise.

The sheaths 12,14 adheres to the animal toe nail 22 with an adhesive of the a-Cyanoacrylate type, widely used for this purpose.

The inventor has developed a novel, and useful animal toe nail cap or sheath 12,14. Providing increased protection for humans and their environment from the harmful effects of animal toe nails 22. The cap or sheath will also afford the animal protection from self trauma, caused by excessive scratching.

To meet these requirements, the cap or sheath 12,14 is of a soft, flexible material, conforming to a small animal's toe nail. Tightness of fit, choice of material the thickness thereof, and longitudinal dimensions co-act to provide strength, comfort, and usefulness.

Though the forgoing represents the preferred embodiment, further modifications may occur to those skilled in the art, without thereby limiting the scope of this invention.

What is claimed is:

1. A covering for an animal toe nail, comprising:
    (a) an elongated sheath of a certain length constructed of generally resilient material, at least on its gripping inner surface;
    (b) a cavity extending throughout the length of the sheath, said cavity having a first open end, an edge having means for engaging against a side wall of an animal toe nail, and a second closed tip end;
    (c) said elongated sheath defining a telescopic relation over an animal toe nail encasing and providing protection therefrom.

2. The covering in claim 1, wherein said tip end of said elongated sheath tapers, to conform with a contour of a sharp end of the animal toe nail.

3. The covering in claim 1, wherein said elongated sheath further includes a top wall, side walls, and bottom wall, each wall disposed in overlaying spaced relation to said animal toe nail throughout its entirety.

4. The covering in claim 3, wherein said walls form an arc, covering toward said closed tip end which culminates in a spherical shape having a thickness greater than said walls.

5. The covering in claim 1, wherein said elongated sheath completely encases said animal toe nail thereby preventing said tip end of said elongated sheath from moving upwardly in relation to the tip of said toe nail.

6. The covering in claim 1, wherein said elongated sheath comprises a diminishing transverse cross section toward said second closed tip end.

7. A toe nail covering for an animal, comprising:
    (a) an elongated, substantially flexible sheath member defining a closed front end and an open rear end, slideablly engageable onto a toe nail of an animal;
    (b) a tubular cavity defined by the flexible sheath, said elongated sheath having walls forming an arc, converging toward the closed front end and terminating in a radial cross section having a thickness greater than the walls, and tubular cavity surfaces serving as gripping portions adapted to receive and retain an animal toe nail; and
    (c) an adhesive means applied to the surface of the tubular cavity for retaining the covering on the toe nail when the adhesive means adheres to the toe nail of the animal.

* * * * *